Feb. 6, 1962  R. J. TEASON  3,019,709
ADJUSTABLE MIRROR BRACKET
Filed June 24, 1958  4 Sheets-Sheet 1

INVENTOR.
RAMONA J. TEASON
BY *Robert L. Slater Jr.*
ATTORNEY

Feb. 6, 1962

R. J. TEASON 3,019,709

ADJUSTABLE MIRROR BRACKET

Filed June 24, 1958

INVENTOR.
RAMONA J. TEASON

BY *Robert L. Slater Jr.*
ATTORNEY

Feb. 6, 1962 R. J. TEASON 3,019,709
ADJUSTABLE MIRROR BRACKET
Filed June 24, 1958 4 Sheets-Sheet 4

United States Patent Office 3,019,709
Patented Feb. 6, 1962

3,019,709
ADJUSTABLE MIRROR BRACKET
Ramona J. Teason, 2801 N. Sheridan Road, Chicago, Ill.
Filed June 24, 1958, Ser. No. 744,244
4 Claims. (Cl. 88—84)

This invention relates to a mechanical device, more particularly it relates to an adjustable bracket for holding a mirror.

Women, in the process of arranging their hair, applying makeup and adjusting their clothing, have a desire to view themselves from behind or from one side, or from slightly above and to one side. With a single mirror none of these vantage points is accessible to a person viewing himself. Present practice is to hold a small hand mirror in one hand while standing before a mounted mirror then by adjusting the hand mirror the desired view of one self may be obtained. One limitation of this method is that the viewer's one hand is then not available for the task of applying makeup, or arranging the hair. A second disadvantage is that one's hand is relatively unsteady and the view thus obtained is accordingly unsteady.

Not infrequently two mirrors are mounted in a narrow room, such as a bathroom and positioned so that a person may obtain a second view of themselves by observing the image of themselves reflected in one mirror through the reflected image of the second mirror. This technique, while affording a steady image, has the disadvantage of being a fixed view; there is no adjustability in such an arrangement.

One object of my present invention is to provide an adjustable, steady bracket for holding a mirror in spaced relationship to a second mirror.

Another object of my present invention is to provide a readily mountable and demountable auxiliary makeup mirror for use in a bathroom or dressing room.

These and other objects and advantages of my invention will be apparent from the following drawings, specifications and claims.

My invention comprises briefly an adjustable bracket for positioning a mirror in spaced relationship to a second mirror comprising a base plate having a T slot therein, means for fixedly mounting the base plate to a vertical surface, a tapered boss having grooves on either side thereof adapted to slide along the T slot, a wedge shaped spring loaded check adapted to engage the tapered side of the boss and bind the boss against free movement along the T slot, an aperture in one end of the boss, an arm having a right angle bend therein, the end of the arm adapted to fit within the aperture, a universal connector on the second end of the arm, and a mirror mounted to the connector whereby the mirror may be vertically positioned with vertical adjustments of the boss in the T slot, horizontally positioned by rotation of the end of the end of the arm in the aperture, and positioned to any desired angle of reflection by adjustment of the universal connector.

Preferred embodiments of my invention are illustrated in detail in the figures, wherein.

Figure 1:
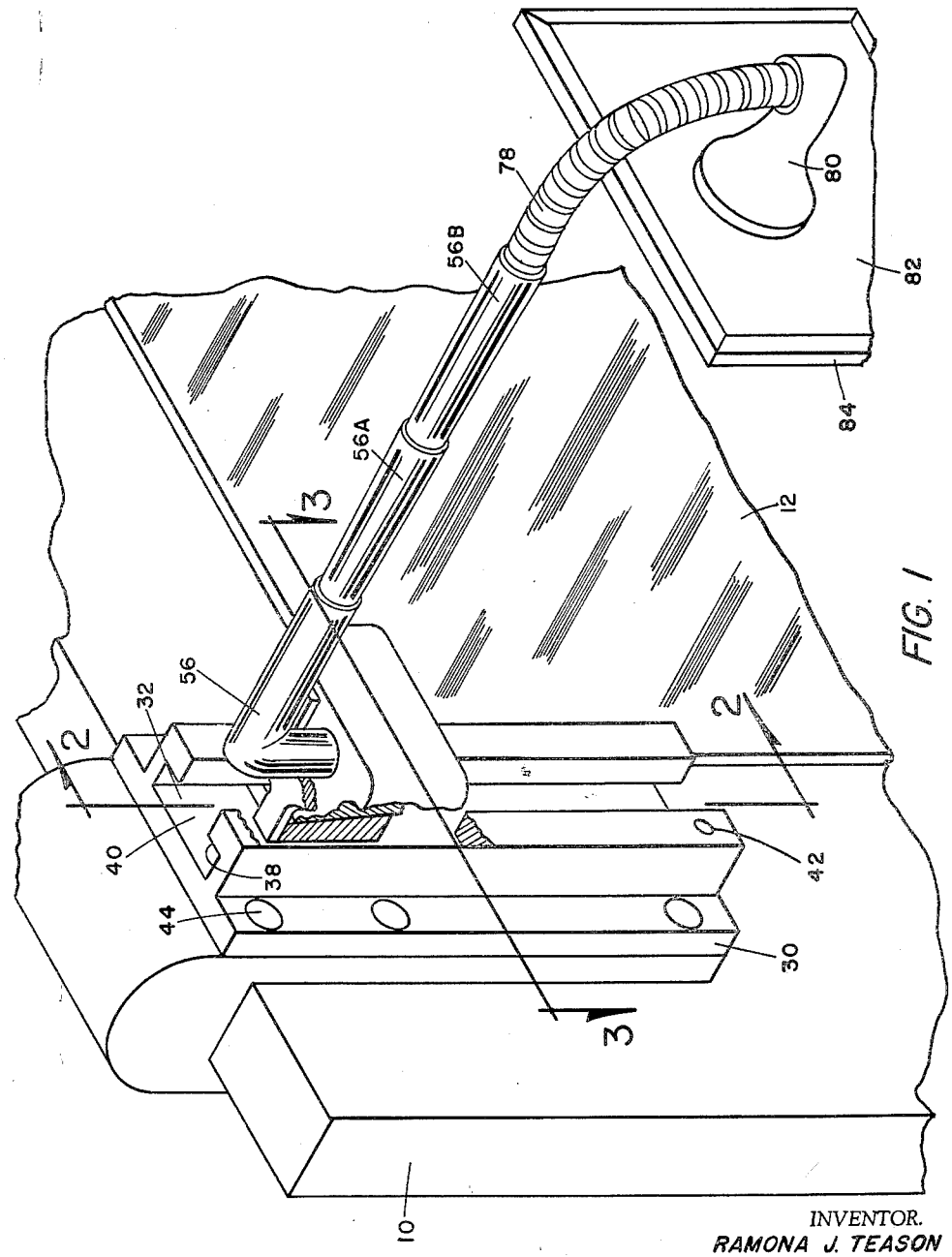
FIGURE 1 is an isometric view of one embodiment of my adjustable mirror bracket mounted to a room door.
Figure 2:
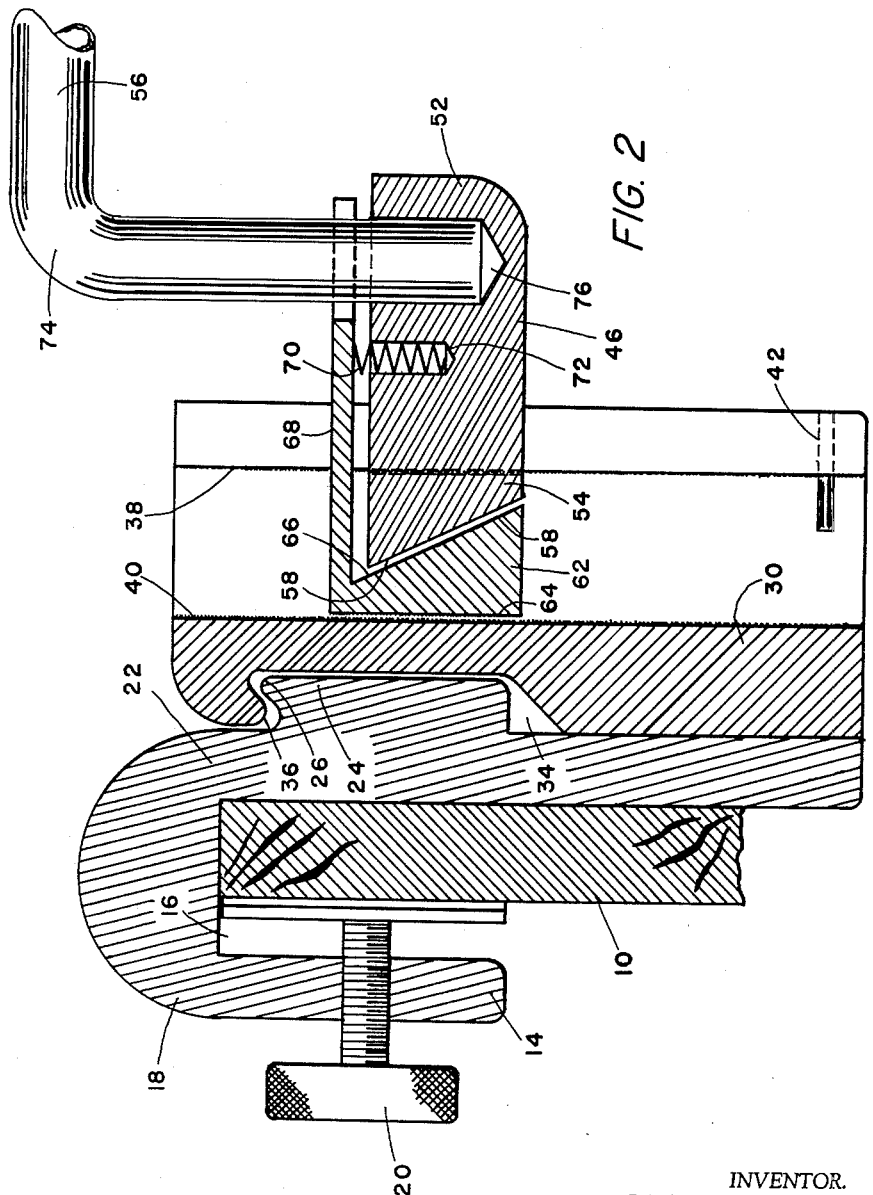
FIGURE 2 is a cross section view taken on line 2—2 of the embodiment of my adjustable mirror bracket shown in FIGURE 1.
Figure 3:
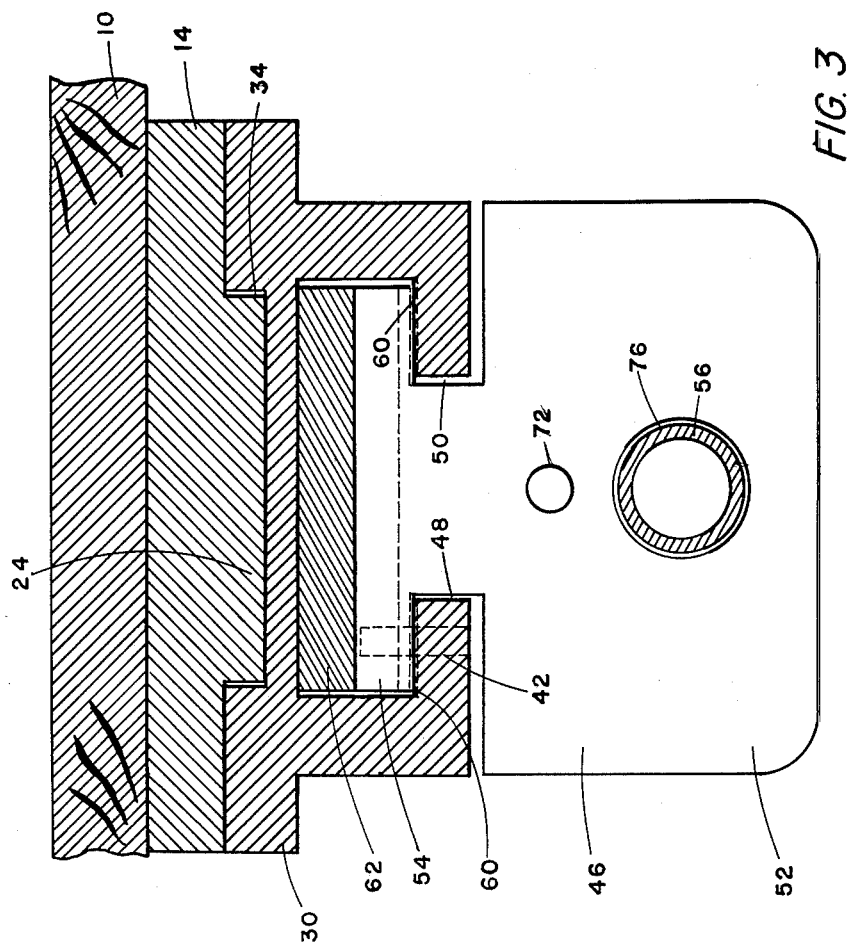
FIGURE 3 is an additional cross section view of my adjustable mirror bracket taken on line 3—3 of the embodiment of my invention shown in FIGURE 1.

Referring now to FIGURES 1, 2 and 3 wherein a preferred embodiment of my invention is illustrated, a typical application is shown wherein I suspend my mirror bracket from the top of a room door 10 which is left ajar for this purpose. The use, such as is illustrated, is suitable for a dressing room or bathroom door in which a mirror 12 is fixedly attached. My adjustable mirror bracket is then suspended from the top of the door 10 with a clamp 14.

The clamp 14 comprises a U-shaped structure having an upper portion 16 suitable for resting on the upper edge of a room door that is ajar. One arm 18 of the clamp 14 is provided with a thumb screw 20 with which the clamp may be tightened against the door. The second side 22 of the clamp 14 is provided with a raised boss 24 along the upper edge of which is a protruding rim 26 that serves as a hook and retaining means for the bracket proper.

A base plate 30 provided with a T slot 32 is suspended upon the clamp 14 by means of an indentation 34 formed in the back of the base plate. The indentation 34 is shaped to receive the boss 24 and hook about the rim 26 with a small lip 36. The inner surface front and rear 38 and 40 respectively of the T slot are serrated. A stop pin 42 is provided on one side of the T slot 32 at the lower portion thereof; the pin 42 limits the motion of the parts, described below, which move along the T slot. The boss plate is provided with openings for bolts 44 along the edge of each side thereof which, though not utilized in the application illustrated, form an alternative means by which the base plate 30 may be suspended from a vertical wall surface.

A tapered boss 46 having grooves 48 and 50 along either side thereof is adapted to move along the T slot 32. The tapered boss 46 has a portion 52 which extends outside the T slot and on to which the mirror arm 56 described below is attached, and a tapered portion 54 adapted to fit within the T slot. The tapered surface 58 of the boss 46 is within the T slot, the narrower portion of the taper being at the bottom of the boss 46 and the wider portion of the taper at the top thereof. The rear surface 60 of the slots 48 and 50 are serrated and adapted to engage the serrated surface 38 within the T slot. A spring loaded check 62 having a serrated surface 64 on the rear side thereof and a tapered contour 66 on the forward side thereof is mounted to engage the tapered surface 58 of the tapered boss 46. The check 62 is further provided with finger release 68 extending from the top thereof forward across the upper surface of the tapered boss 46. A coil spring 70 seated within a small opening 72 loads the check member 62 by forcing the finger release 68 upward away from the upper surface of the tapered boss 46 and therewith slides the tapered surfaces 58 and 60 into locked position.

Adjustment of the vertical position of the tapered boss 46 is readily accomplished by compressing the spring 70 thereby releasing the pressure against the serrated surfaces 38 and 40 by action of the check 62 sliding along the tapered surface 58 of the tapered boss 46. Release of the finger release 68 immediately locks the tapered boss 46 in fixed position with respect to the T slot.

The mirror arm 56 is provided with a right angle bend 74 near the base end thereof. The tapered boss 46 is provided with an aperture 76 into which the end of the mirror arm 56 may be inserted; the arm 56 is held rigidly with respect to all movements excepting horizontal rotation. The second end of the mirror extension arm 56 terminates in a universal connecter 78 which is adaptable to rotate in all degrees of freedom. The universal connector 78 is attached to a small fitting 80 to which a mirror 82 is suspended within a light frame 84.

The mirror arm 56 is provided with telescoping sections 56a and 56b with which the arm when not in use may be readily collapsed and thus put out of the way.

Vertical movement of the entire mirror bracket is obtained by movement of the tapered boss 40 along the T slot 32. Horizontal movements of the mirror 82 are accomplished by rotating the mirror arm 56 within the aperture 76 about the axis thereof. Angular adjustments of the mirror 82 are accomplished by movement of the universal connector 78.

Figure 4:
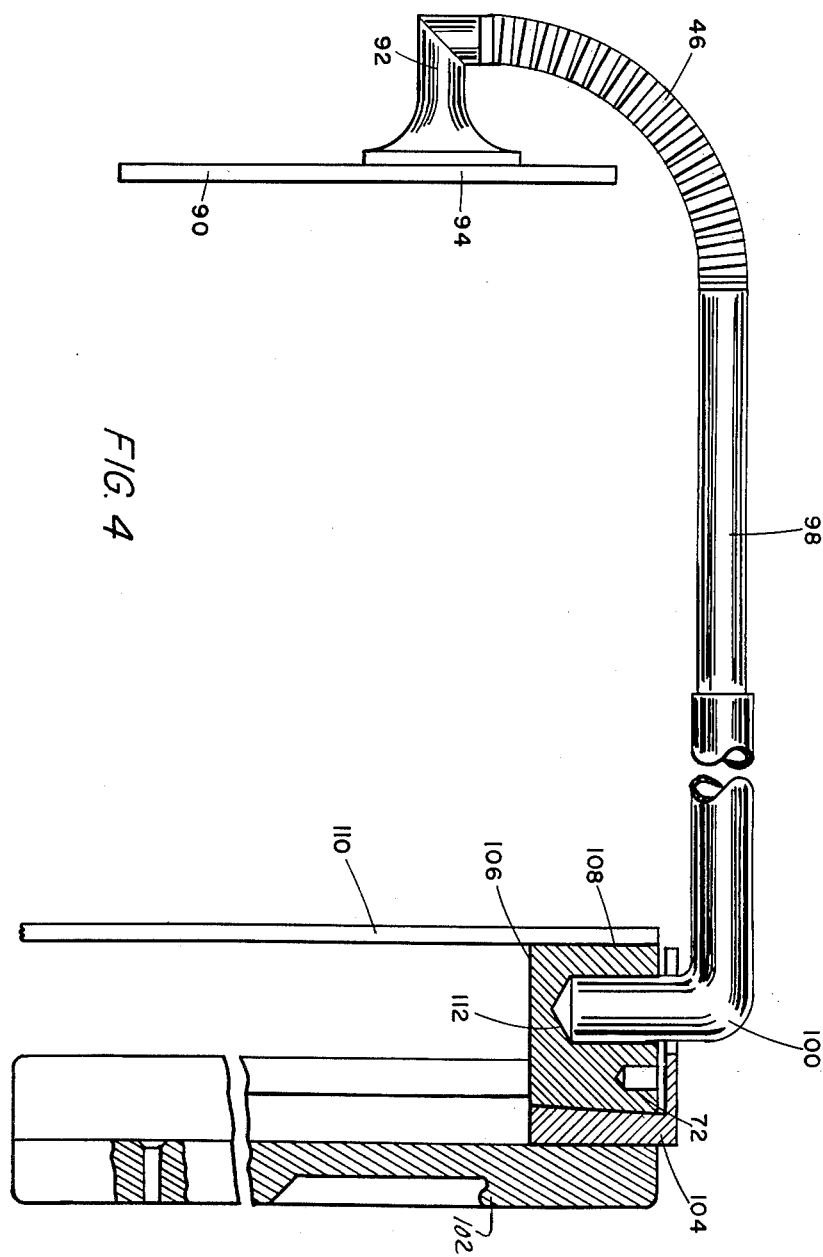
FIGURE 4 is a side view partly cut away of a second embodiment of my adjustable mirror bracket invention.

A second embodiment of my invention is illustrated in FIGURE 4 wherein a mirror 90 attached to a fitting 92 and held within a frame 94 is suspended by a universal connector 96. The connector 96 is held firmly at one end thereof by a telescoping extension arm 98. The end of the arm 98 is bent at 90° as shown at 100. A base plate 102 similar in all respects to that illustrated in the embodiment described above at 30 is provided with a check 104 which also is similar in all respects to that illustrated above at 62 and a tapered boss 106. The tapered boss 106 is similar in all respects to that illustrated in 46 above excepting that a plain surface 108 is provided thereon suitable for attaching rigidly thereto a mirror frame and mirror 110. The mirror extension arm 98 is mounted within and aperture 112 free to rotate horizontally about the axis thereof. The embodiment of my invention illustrated in FIGURE 4 operates in all respects similarly to the operation of the embodiment described in FIGURES 1, 2 and 3 excepting that the mirror 110 is carried vertically along on the boss 106. This latter embodiment is particularly adaptable to a dressing room or beauty parlor wherein persons of different heights would have occasion to utilize the mirrors. Typically the second embodiment described immediately above is mounted to a door frame or the surface of a vertical wall.

The foregoing specifications and illustrations are merely illustrative of the nature of my invention, the scope thereof being limited only by the following claims.

I claim:
1. An adjustable bracket for positioning a mirror in spaced relationship to a second mirror comprising the combination of a base plate having a T slot therein; means for fixedly mounting the base plate to a vertical surface, the second mirror being mounted to the vertical surface; a boss having sides, a rear, and an upper surface having grooves on both of the sides thereof adapted to slide within the T slot, the boss having a tapered surface on the rear side thereof; a wedge shaped spring loaded check adapted to engage the tapered rear side of the boss and bind the boss against free movement within the T slot; an aperture in the upper surface of the boss; an arm comprised of a plurality of telescoping hollow sections and having a right angle bend a spaced distance from a first end thereof, said first end of the arm adapted to fit within the aperture; a universal connector on the second end of the arm; and a mirror mounted to the connector; whereby, the mirror may be positioned with respect to the second mirror with vertical adjustments of the boss in the T slot, adjusted horizontally by rotation of the first end of the arm in the aperture positioned with respect to distance from the second mirror by extension and contraction of the telescoping arm and positioned to any angle of reflection by adjustment of the universal connector.

2. An adjustable bracket for positioning a first ladies dressing mirror in spaced relationship to a second dressing mirror fixedly mounted to a door comprising an elongated teelscoping arm having a first and a second end, a universal connector mounted at the first end thereof, a bracket adapted to hold the mirror to the universal connector, a right angle bend in the arm a spaced distance from the second end thereof, a base plate adapted for mounting to the door frame adjacent to the second mirror, the base plate being provided with a vertical T slot, a boss having sides and a tapered rear surface and an upper surface and having deep grooves on either side thereof adapted to slide freely within the aforesaid T slot, an opening on the upper surface of the boss adapted to receive the second end of the arm, and a spring loaded releasable tapered means adapted to check the vertical motion of the boss in the T slot.

3. An adustable bracket for positioning a mirror in spaced relationship to a second mirror comprising in combination an elongated telescoping arm having a first and a second end; a universal connector mounted at the first end thereof; a mirror within a frame attached to the universal connector; a right angle bend in the arm a spaced distance from the second end thereof; a base plate adapted for mounting to a fixed vertical surface, the said second mirror being mounted to the fixed vertical surface, and the base plate being provided with a vertical T slot; a boss having sides, a tapered rear surface and an upper surface, and having a deep groove on either of the sides thereof adapted to slide freely within the aforesaid T slot; a check having a tapered side adapted to slide within the T slot and to engage the tapered rear of the boss; and an opening in the upper surface of the boss adapted to receive the second end of the arm; whereby, the mirror within the frame may be positioned vertically by motion of the boss and check within the T slot, may be positioned horizontally by rotation of the arm within the said opening and may be positioned at any convenient distance from the second mirror by telescope extension of the arm, and, finally, may be positioned to any angle of reflection by adjustment of the universal connector.

4. A device for positioning two mirrors in spaced relationship comprising a first mirror mounted within a frame; a universal connector mounted to the first end of a telescoping arm, the connector being rigidly attached to the frame; a right angle bend in the arm a spaced distance from a second end thereof; a base bracket adapted for fixedly mounting to a vertical surface; a vertical T slot within the base bracket; a boss having sides, an upper surface and a tapered rear, and further provided with deep grooves on both sides thereof adapted to slide within the aforesaid T slot; a tapered spring loaded means adapted to slide within the T slot and engage the tapered rear of the boss; an aperture in the upper surface of the boss adapted for receiving the second end of the arm; and a second mirror rigidly attached to one side of the boss; whereby, the vertical heights of both mirrors may be adjusted by movement of the boss along the T slot, the horizontal position of the first mirror with respect to the second mirror may be adjusted by rotation of the arm within the said aperture and by adjustment of the length of the telescoping arm, and the angle of reflection of the first mirror in the second mirror may be adjusted by positioning the universal connector.

References Cited in the file of this patent

UNITED STATES PATENTS

| | | |
|---|---|---|
| 115,898 | Roberts | June 13, 1871 |
| 760,478 | Obermiller | May 24, 1904 |
| 2,168,003 | Stone | Aug. 1, 1939 |
| 2,569,622 | Trainor | Oct. 2, 1951 |

FOREIGN PATENTS

| | | |
|---|---|---|
| 617,565 | France | Nov. 20, 1926 |
| 807,158 | France | Oct. 12, 1936 |